United States Patent
Blalock et al.

(12) 
(10) Patent No.: US 6,194,519 B1
(45) Date of Patent: Feb. 27, 2001

(54) PRODUCTS USEFUL AS ROOF SHINGLES AND A PROCESS FOR MAKING SUCH PRODUCTS

(76) Inventors: Christopher Blalock, 2142 Mill Creek Rd., Halls, TN (US) 38040; Larry Nelson, 1255 Thorntree Dr., Dyersburg, TN (US) 38024

( * ) Notice: Subject to any disclaimer, the term of this patent is extended or adjusted under 35 U.S.C. 154(b) by 0 days.

(21) Appl. No.: 09/118,962

(22) Filed: Jul. 20, 1998

(51) Int. Cl.[7] ................ C08J 3/00; C08K 3/34; C08L 45/00; C08L 55/00; C08L 9/00
(52) U.S. Cl. .......... 525/232; 524/444; 524/493; 524/495; 524/518; 524/525; 524/526; 524/536; 525/240
(58) Field of Search .................. 524/495, 493, 524/444, 518, 525, 526, 536; 525/232, 240

(56) References Cited

U.S. PATENT DOCUMENTS

| | | | |
|---|---|---|---|
| 5,010,122 | * | 4/1991 | Koski ........................... 524/80 |
| 5,157,082 | * | 10/1992 | Johnson ........................ 525/237 |
| 5,256,228 | * | 10/1993 | Davis et al. .................. 156/157 |
| 5,286,798 | | 2/1994 | Davis . |

* cited by examiner

Primary Examiner—Patrick D. Niland

(57) ABSTRACT

The present invention relates to low-cost, efficiently-manufactured, polymer-based products useful as roofing shingles and similar products. The inventive shingles are weatherproof, inexpensive to manufacture and durable, particularly as contrasted with conventional shingles in areas of the country subject to hail damage. The invention also includes a method of making such shingle products. In a preferred embodiment, products of this invention use rubber material as the polymer base in combination with specific types of polyolefins. The rubber material can be most efficiently provided by the use of crumb rubber particles from spent automobile tires and other recycled rubber debris which are readily available and of very low cost. The products will have an average life far greater than that of current commercial roofing shingles, which are made using fiberglass or asphalt.

The products of the instant invention are produced by extrusion as a mixture of materials, which product and its materials can be summarized as follows as a roofing shingle product which comprises:

a. one or more side-branched polyolefins as an elastomer;
b. optionally a blend of additional synthetic polymers, such as ethylene and propylene, as a second elastomer; and
c. a rubber fraction, preferably obtained in part from recycled spent automotive or truck tires, and similar sources of waste rubber (sometimes known as "crumb rubber"), ground or recycled into particles having a mesh size of from 10 to 30 (i.e., approximately from about 500 to about 1000 microns).

9 Claims, No Drawings

PRODUCTS USEFUL AS ROOF SHINGLES AND A PROCESS FOR MAKING SUCH PRODUCTS

BACKGROUND OF THE INVENTION

1. Brief Description of the Invention

The present invention relates to low-cost, efficiently-manufactured, polymer-based products useful as tab-type strip shingle roofing products as well as for other uses. The inventive shingles are weatherproof, inexpensive to manufacture, and durable, particularly as contrasted with conventional shingles in areas of the country subject to hail damage. In such uses, the inventive roofing shingle products will have an average life far greater than that of current commercial roofing shingles, which are made using fiberglass or asphalt.

The invention also includes a method of making such products. In a preferred embodiment, products of this invention use rubber material as the polymer base in combination with specific types of polyolefins. The rubber material can be most efficiently provided by the use of "crumb rubber" particles ground from spent automobile tires and other recycled rubber debris, which are readily available and of very low cost.

2. Description of the Prior Art

General

The market for construction roofing products, including tab-type strip roofing shingles, is very large. Each year, several million new homes are built in the United States and Canada utilizing sloped roofs with roofing shingles, and additional millions of existing homes have their roofing materials replaced. A majority of all North American slope-roofed private homes employ tab-type strip roofing shingles.

Commercial roofing products, other than very expensive slate, tile, or cedar wood products used for very high end houses, are today either asphalt or fiberglass based. The use and manufacture of these products including the expense of raw materials, damage from the consequences of the use of highly combustible raw materials in their manufacture, surprisingly quick degradation when exposed to the elements and consequent short useful life, and in the South and Southeast, high levels of actual breakage caused by hail, have caused much concern.

The construction industry has therefore long sought a competitively priced, relatively low-cost, roofing product that could be efficiently manufactured to sell into this multibillion dollar-per-year North American market without the problems described. Scientists and practical construction industry management have long searched for a roofing product that used cheaper and better raw materials than such traditional materials as asphalt and fiberglass, which comprise almost all such commercial products in the present day.

The search for such new products has, up to now, also unsuccessfully looked at the potential for use of a major American waste product, which itself has not found commercial uses at anything approaching the volumes of waste materials produced. For almost as long as rubber tires have been manufactured, the question of finding an acceptable use for worn-out tires has stimulated invention. References to the history of this development are set forth in U.S. Pat. No. 4,851,500, where recycling patents as old as 1957 are cited, with "related" patents as old as U.S. Pat. No. 1,550,968 (1925). Similarly, the concept of recycling rubber tire material by grinding such material into small pieces is quite old. U.S. Pat. No. 3,210,301 discloses two improvements for reducing the processing time of recycled rubber used for rubber compounding and describes the recycling use in 1965 as already "well known". A 1978 U.S. Pat. No. 4,125,578 describes a heat process for reclaiming vulcanized crumb rubber from tires.

Interestingly and somewhat strangely, the use of large geometrical pieces of tires as roofing is similarly old. U.S. Pat. No. 3,803,792 for a "Tire Roof" discloses the construction of a roof covering made from cut and segmented waste tires, providing in effect a tile roof where the tiles are segments of tires. Work has continued in this unusual area of the use of cut-up tire segments up to the present day, with improvements in the configuration of the tire segments shown in U.S. Pat. No. 5,086,552 and U.S. Pat. No. 5,675,954 as recently as October, 1997. In none of these patents is any consideration shown of the possibility of the creation of a new roofing product from particles of tires and other materials. Similarly, there is no consideration shown of the utility of small (millimeter-sized) pieces of ground tire material.

The general concept of using small pieces of rubber, such as crumbs from the recycling process, to add desired characteristics to other materials is known. U.S. Pat. No. 4,109,041 (1978), as a representative example, teaches the use of waste rubber particles in making non-slip coatings on construction panels.

Several patents as to the reuse of recycled tire waste to make various types of sheet goods, including roofing sheets, were filed starting in the 1950's. These early patents, and their more modern progeny, use heat and thermosetting agents to create molded articles. For example, U.S. Pat. No. 3,027,599 discloses a method of molding articles from scrap tire material, using a thermosetting binding agent. U.S. Pat. No. 3,267,187 discloses the use of crumb rubber (not specifically from scrap tires) in formed, resin-fused textured sheet flooring. U.S. Pat. No. 3,844,668 generally shows the use of recycled rubber from whole tires, reacted at high temperatures with asphalt, and then dissolved in kerosene or a similar hydrocarbon, to repair pavements or roofing.

Other patents utilizing rubber utilize crumb rubber to make rubber sheet goods or similar goods which might be used on roofs. One set of patents demonstrate attempts to obtain useful materials from rubber ingredients by essentially using pressure alone. U.S. Pat. No. 5,527,409 discloses a log-like structure created from pressed crumb rubber which is spirally sliced into sheets (with a separate waterproofing compound to be added after installation)—the patent does not disclose any elastomer or other blending additives and describes the only bonding mechanism as being pressure.

Another group of patents deal with batch-type molding or casting processes for making recycled rubber roofing products involving extensive curing (i.e., polymerization), in contradistinction to a continuous-type extrusion process followed by at most limited curing. U.S. Pat. No. 4,028,288 shows a heat and pressure-molded mixture of ground tires, including the fibrous tire cords, and a synthetic thermoplastic resin. The patent identifies a useful synthetic thermoplastic resin as comprising at least one of the materials polyethylene, styrene, and polypropylene.

U.S. Pat. No. 4,795,603 describes a process of mixing rubber waste and crushed rugged molded polyethylene or polypropylene wastes together, and heating, pressing, and injecting them so as to mold them. The injection moulding composition is described as useful for batch-type molding processes, rather than a continuous extrusion-type process.

U.S. Pat. No. 4,851,500, previously discussed, shows the use of scrap rubber, sulfur and pressure to make a cured rubber product for use as roofing products such as roll roofing, tiles, shakes and slates, and other materials. The patent describes this use as an improvement over prior art because it uses pressure rather than a working and plasticizing action such as a screw; it also requires the use of sulfur. For background, Bertolino published European Patent Application 0 401 885 is similar, in that it emphasizes the admixture of waste rubbers, plastics, and fibers, mixed with polyethylene or another thermoplastic, and then heated by an extruder or any other similar system.

U.S. Pat. No. 5,254,405 and its continuation-in-part, U.S. Pat. No. 5,385,953, teach the embedding of crumb rubber in a polyurethane matrix. U.S. Pat. No. 5,258,222 utilizes crumb rubber in a cast, tile-like roofing product which is liquid, and cures after pouring. The patent teaches the requirement of epoxy resin or neoprene to hold the other materials together along with silica and other materials.

Three related patents (U.S. Pat. No. 5,453,313, its continuation U.S. Pat. No. 5,580,638, and its continuation-in-part U.S. Pat. No. 5,525,399) disclose the use of polysulfide together with rubber for structural strength. The continuation patents add fire retardant and ultraviolet protection compounds, and an asphalt matrix. The process which is common to all three patents requires in addition to polysulfide, extensive curing.

U.S. Pat. No. 5,635,551 discloses an improvement in the molding of articles using pulverized recycled tires by specifying a limited range of thermoplastic resins. The patent requires the use of five additional ingredients (starch, acetone, caustic soda, glass wool and ammonium phosphate) with starch, which must comprise at least 5% by weight of the finished composition, having the highest percentage requirement.

A number of alternate technologies for creating materials which gain their strength and hardness from covalent chemical bonds with crumb rubber have also been attempted.

U.S. Pat. No. 4,244,841 utilizes sulfur and zinc stearate as a cure mix to form a rolled product one inch in diameter suitable for roofing, and requires sulfur to achieve its result. U.S. Pat. No. 4,970,043 shows the use of a "cohesive base material" such as a styrene-butadiene block copolymer, and a minimum of "at least" 50% ground rubber. The patent also involves the recycling of exclusively high grade rubber.

U.S. Pat. No. 5,010,122 describes a thermoset composition comprising crumb rubber having a size less than 10 mesh, a thermoplastic material which can include olefinic polymers with blends of similar polymers, and one or more coupling agents. Bonds are caused by reactions with the coupling agent bonding the crumb rubber and olefin polymers together. The patent describes the requirement of at least one coupling agent, and covalent bonds or equivalent chemical bridges between the rubber and the thermoplastic material. The patent specifically identifies silane coupling agents to form the required covalent bonds.

The concept of a polyolefin sheet material for roofing, like that of a rubber material for roofing, is not new: see for example U.S. Pat. No. 5,256,228. U.S. Pat. No. 3,547,674 (1967), claims the use of asphalt to anchor a polyolefin fabric, with more asphalt anchoring individual crumb rubber pellets attached to the fabric.

There are a number of patents which utilize rubber plus an olefinic substance, but none of them envisions the use of crumb rubber. Rather, they concern polymerization reactions between specific rubber compounds and olefin or polyolefin compounds, generally with high initial crystallinity or with a crystallinity promoter, and generally require other specific chemicals appropriate to the particular polymerization reactions being described. See U.S. Pat. No. 4,311,628 which describes a blend of polyolefin resin and particles of EPDM rubber of a size below 50 microns average, cured using phenolic compounds. U.S. Pat. No. 5,157,081 teaches a vulcanized rubber in a crystalline polyolefinic resin matrix. Rubbers useful are listed as bromobutyl rubber, chlorbutyl rubber, butyl rubber and mixtures thereof with curing required with a non-peroxide curing system. U.S. Pat. No. 5,290,886 adds low molecular weight ester plasticizers.

U.S. Pat. No. 5,389,715 claims an uncured sheet polyolefin polymer roofing product which is made semi-self-sealing by curing in place on a rooftop through the inclusion of a "cure package." U.S. Pat. No. 5,594,073 claims a roofing composition involving blends of two specific rubbers, a narrowly-defined urea composition, sulfur, an accelerator, and a cure activator.

A patent which teaches the use of rubber in roof shingles, U.S. Pat. No. 5,338,783, teaches the requirement of silicone rubber, silicon dioxide, and aggregates to make tab shingles.

There are a few patents which involve extrusion processes involving crumb rubber and polyolefins. The first of these is U.S. Pat. No. 5,157,082. The patent shows a product made from 10–90 parts by weight of ground rubber, of a maximum 1.5 mm. average size, and also describes about 90 to 10 parts by weight of polyolefin resin and at least 0.5 parts by weight of one or more functionalized olefin polymers per 100 parts by weight of polyolefin resin. A second product and process disclosed require about 90 to 10 parts by weight of one or more functionalized olefin polymers. Such functionalized olefin polymers are described to be a copolymer of at least one olefin and at least one ethylenically unsaturated organic monomer; wherein said organic monomer is selected from the group consisting of unsaturated mono or dicarboxylic acids having from 3 to 20 carbon atoms; acid anhydride, maleamic acid, acid halide, ester and metal salt derivatives of said unsaturated mono or discarboxylic acids; vinyl esters of saturated carboxylic acids, wherein the acid constituent of said saturated carboxylic acid has from 2 to 18 carbon atoms; vinyl alkyl ethers wherein said alkyl constituent has from 1 to 18 carbon atoms; vinyl halides; vinylidene halides; acrylonitrile; methacrylonitrile; and styrene.

U.S. Pat. No. 5,523, 328 discloses extrusion products employing crumb rubber and polyolefin. The patent specifies that the ground tire waste must comprise rubber and metal debris. Spent tires typically comprise about 60–70 percent rubber, 20–30 percent steel, and 5–10 percent textile fibers according to the patent's specification.

While all the above described patent activity indicated a long-term scientific search to create a new type of rubber-based roofing shingle, as of this date, the inventors hereof are unaware of any commercial roofing shingle product available to the public, or under commercial development, other than asphalt and fiberglass-based shingles.

OBJECT OF THE INVENTION

It is an object of the present invention to solve or substantially alleviate the problems created by prior art asphalt and fiberglass roofing shingles, including the expense of raw materials, relatively quick degradation when exposed to the elements and, in certain regions, high levels of breakage and cracking caused by hail.

It is another object of the present invention to provide a product that is weather resistant, made with low cost materials and possessed of excellent green strength.

It is a further object of the invention to provide a product which can easily be made very inexpensively, using available commercial materials and largely current extrusion process technology on a continuous, semi-continuous, or batch basis.

Other objects, as well as advantages, of the invention will become clear from the following summary and description, or will become apparent to the skilled artisan, as obvious variations of the instant invention.

DESCRIPTION OF THE PREFERRED EMBODIMENTS

The products of the instant invention are produced by extrusion as a mixture of materials, which products and its materials can be summarized as follows:

A product, including a roofing shingle product, which comprises:
a. one or more side-branched polyolefins as an elastomer;
b. optionally a blend of additional synthetic polymers, such as ethylene and propylene, as a second elastomer; and
c. a rubber fraction, preferably obtained in part from recycled spent automotive or truck tires, and similar sources of waste rubber (sometimes known as "crumb rubber"), ground or recycled into particles having a mesh size of from 10 to 30 (i.e., approximately from about 500 to about 1000 microns);
wherein the rubber fraction comprises about 25–30% by weight of the total product.

The product can contain a wide variety of other ingredients, such as carbon black, coal dust, silicates, clays, aromatic, napthenic, or paraffinic hydrocarbons as plasticizers, and other materials.

The first important element, element (a), for producing the products of this invention, is one or more side-branched polyolefins.

Polyolefins are chemicals based on olefins; olefins being a class of unsaturated aliphatic hydrocarbons having one or more double bonds, usually obtained by cracking naphtha or other petroleum fractions at high temperatures (1500°–1700° F.). Those olefins containing one double bond are called alkenes, and those with two, alkadienes or diolefins. Alpha olefins or a-olefins are particularly reactive, because the double bond is on the first carbon atom. Common uses of polyolefins are as industrial oils, hydraulic fluids, and heat transfer fluids.

Polyolefins are actually polymers derived by polymerizing simple alpha olefins. Many commercial polyalphaolefins are formed by polymerization of olefins, such as ethylene, in the presence of suitable metal halide catalysts. Such olefins contain 2 or more carbon atoms. Most important commercially are polyethylenes, polypropylenes, polybutenes, polyisoprenes and copolymers thereof.

Olefins can be described as having the representative formula:

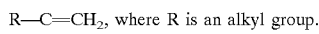
R—C=CH$_2$, where R is an alkyl group.

The production of polymers of olefins by the use of aluminum halide catalysts and by high-pressure thermal or peroxide-catalyzed polymerization is well known in the prior art. Many such commercially available polyolefins are excessively waxy, and have therefore been found unsuitable for the instant invention.

In a preferred embodiment, newly-developed commercial polyolefin polymers should be used to make the inventive products disclosed herein. Such commercial polyolefins have more side branches and less crosslinking than previously-available polyolefins. Side chains are groups of atoms attached to one or more of the locations in the main polymer backbone. These modern type polyolefins are preferably saturated ethylene-octene copolymers, lightly crosslinked by peroxide, irradiation and/or silane. Such polyolefins are characterized by narrow molecular weight distribution and long chain side branching from 5 to 20 carbon atoms.

A chemical formula representative of these preferred polyolefins is:

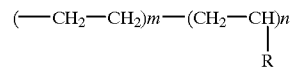
$$(\!-\!CH_2\!-\!CH_2)_m\!-\!(CH_2\!-\!CH)_n$$
$$|$$
$$R$$

R=is representative of side chain branching extending from one or more of the n groups; the sum of m+n is typically between 4 and 400.

Such polyolefins preferably have the following range of values:

| | |
|---|---|
| Density, g/cc, ASTM d-792 | .850–.930 |
| 100% Modules, Mpa, ASTM D-412 | 1 > 10 |
| Elongation, %, ASTM D-638 | 500+ |
| Melting point, ° C. | 45–100 |
| Hardness, Shore A, ASTM D-2240 | 60–95 |
| Melt index, 12, ASTM D-1238, dg/min. | .25–35 |
| Low temperature brittleness, ° C., ASTM D-746 | <50 |

The inventive products preferably rely for their cohesiveness upon the green strength derived from these polyolefin materials. These modified polyolefins have less typical thermoplastic properties than traditional polymers (it is speculated that their numerous side branches make them more "rubbery").

Particularly useful in formulating the instant invention are polyolefins made by several companies including DuPont, Dow Chemical, Exxon, DSM and Union Carbide Corporation. Particularly preferred are polyolefins sold under the tradenames Engage (DuPont—Dow Elastomers) and Exact (Exxon), and most Particularly Engage 8150.

Optional element (b) can be any type of a large family of well-known elastomers which are based on synthetic manmade polymers. Ethylene and propylene are the most preferred.

Element (c), the rubber fraction, can be broadly defined as any ethylene-propylene copolymer (also referred to as EPDM or EPT). This fraction is preferably provided in whole or in part by recycled discarded rubber products, and most preferably spent automotive tires.

EPDM products are elastomers based on stereospecific linear terpolymers of ethylene, propylene, and small amounts of a nonconjugated diene, e.g., a cyclic or aliphatic diene (hexadiene, dicyclopentadiene, or ethylidene norbornene). The unsaturated part of the polymer molecule is pendant from the main chain which is completely saturated.

EPDM can preferably be provided by newly made products such as Nordel 2470 and newer grade Nordel IP 4770 P. These products are in pellet form. A specific example of EPDM has the following specifications (it is to be understood that broad range of each of the below specific specifications for different EPDM products are also useful for this invention):

| | |
|---|---|
| Specific gravity (22C.) | 0.86 |
| Mooney Viscosity, ML 1 + 4 (121C.) | 68+/−5 |
| Molecular weight distribution | Narrow |
| % Ethylene | 69% (same crystalline) |
| 3$^{rd}$ Monomer | EMB |

Tires, most particularly their cover strips for sidewalls and tire tubes, are composed primarily of EPDM. Recycled rubber, as defined by the Rubber Recycling Division of the National Association of Recycling Industries, Inc., can be said generally to refer to any and all sorts of rubber waste, including scrap tires, that have been converted into an economically useful form, such as reclaimed rubber, ground rubber, reprocessed rubber and die-cut punched rubber parts. Such discarded rubber waste products may also include pneumatic tires, liners, tubes and any other discarded rubber product or by-product formed from natural rubber, polymers and co-polymers of snythetic rubber, i.e. styrene-butadiene rubber, ethylene-propylene diene rubber, and the like, or blends thereof Preferably, the recycled products to be used for the invention are first ground into particulates having a size less than or finer than about 30 mesh, and are often called "crumb rubber" by people in the industry, and are so designated for this invention. Rubber particulate having sizes in the range of from about 10 mesh to about 30 mesh have been found to be quite useful in forming the inventive product. Generally, the finer the particle size, the more commercially attractive the shingle's physical appearance.

The recycled rubber particulate may be formed using suitable grinding techniques known in the art. Commercially available ground waste rubber can be used. Any metal within the waste rubber should preferably be removed, either mechanically, magnetically or by other known techniques. After the rubber particulate or crumb has been formed, it along with the other materials described above are fed into a continuous mixing device.

The inventive polymeric products are easily made and easily used, and are equal to or better than comparable higher-cost products in a wide spectrum of roofing applications.

Note specifically that the inventive products need not include a "cure package" or the equivalent, but are essentially mixtures which cool to form an extrudible substance. Specifically, the elastomers used preferably do not form copolymers and do not polymerize one with the others.

Preferably the products of this invention are used as roofing shingles; however, by varying extrusion conditions and the thickness of the extrudate a wide variety of construction and other products including for example, underlay materials used as replacements for 15 pound or 30 pound roofing felt, can be made using this invention.

The inventive roofing shingles can be applied in the same manner and circumstances as conventional asphaltic or fiberglass strip shingles. They have light weight, compared with other shingles, providing potential cost savings in the design of structural roof supports, as well as ease of application. They provide outstanding strength and durability, together with excellent temperature stability, weatherability and resiliency. They are particularly suited for use in areas of the Southern portion of the United States which are exposed to significant risk of severe hailstorms.

The roofing shingles and other products of the instant invention are easily made products. Apart from its use of the specified raw materials, the process used to make the inventive product largely follows conventional techniques for manufacturing products such as strip shingles. The materials described above making up the product can be masticated by mechanical means (a Banbury Mixer or an equivalent device) forming a compound which is passed through a device to remove the thermal energy introduced from the mechanical mastication. Neither coupling agents nor co-agents are needed to form any type of covalent bond during processing, and the pressure, temperature and time of the process should be selected so that no vulcanization of the raw materials occurs. Temperatures of 150° F. to 300° F. are particularly preferred.

The cooled product can be made into strips of a width appropriate for feeding into an extrusion or equivalent device to produce a continuous sheet. After the sheet has been allowed to cool, it is trimmed to a standard width and is fed into conventional shingle-making equipment, where ceramic roofing granules can be added using a spray adhesive. A series of individual three-tab shingles can then be stamped, and adhesive added so as to cause the tabs on each shingle to adhere to the shingle below it in a typical roof installation. These individual shingles can then be packaged and palletized for delivery to warehouses or retail locations.

The flash point of the components making up the inventive roofing products are over 500° F, and the temperature of manufacture usually is no greater than 350° F. Since there is no chemical reaction of the various components, the disadvantage of prior art processes and products containing flammable, combustible asphalt can be avoided. Separate fire retardant chemicals used in competitive processes can also be eliminated. Also the use of sulfur, common in other commercial processes, can also be eliminated.

The manufacturing process has no significant adverse environmental implications, while consuming a waste raw material which is otherwise very difficult to dispose of Spent tires are, in the main, not suitable for landfills, and the market for crumb rubber suffers from severe oversupply. The shingle products made by the inventive process are themselves recyclable into crumb rubber, which can be used to make additional shingles.

The present invention is further illustrated by the following examples. All parts and percentages in the examples as well as in the specification and claims are by weight unless otherwise specified. The following examples are illustrations designed to assist those skilled in the art to practice the present invention, but are not intended to limit the invention. Changes can be made without departing from the spirit of the invention. The various chemicals used in the examples are commercial materials.

EXAMPLE 1

The following materials were mixed together with a Banbury mixer to form a material mixture. The resultant product was extruded in a mill and the results described obtained:

| Materials | Amount (in parts) |
|---|---|
| Engage 8150 Polyolefin | 50 |
| Silicate clay* | 100 |
| Carbon black | 100 |
| Reground rubber crumb from whole tires** | 100 |
| Nordel 2470*** | 50 |
| Sundex 790, a highly aromatic oil made from a parafinnic base | 100 |

-continued

| Materials | Amount (in parts) |
|---|---|
| Austin Black, crushed coal fines | 150 |
| | 550 Total parts |

*Kaolin clay - fineness, retained on 325 mesh
**Fiber content 1%; metal content <.10%; mesh size 10–30.
***EPDM pellet form Conditions of test

| Mixer drop temperature | 260° F. |
|---|---|
| Mill temperature | 170° F. |

Test Results

| Visual appearance | Very good |
|---|---|
| Pull test | Very good |
| Tear test | Very good |

Discussion of Results:

The above test results show products which demonstrate a visual appearance equal to conventional asphalt-based roofing shingles. The pull and tear test results are better than those obtained from conventional shingles—these tests indicate superior hail resistance, improved tensile strength and greater structural strength which are all indicia of a longer useful life.

EXAMPLE 2

The following materials were mixed together for form an extrudible material using the same techniques as Example I. The resultant extruded product was tested and the results are summarized below:

| Material | Amount (in parts) |
|---|---|
| Engage 8150 | 100 |
| Silicate clay - Kaolin | 50 |
| Alumina silicate filler | 25 |
| Sundex 790 | 100 |
| Carbon black | 100 |
| Reground rubber crumb from whole tires - same as example I | 200 |
| Austin Black - crushed coal fines | 200 |
| | 575 Total Parts |

Conditions of test

| Mixer drop temperature | 265° F. |
|---|---|
| Mill temperature | 180° F. |

Test Results

| Visual appearance | Excellent |
|---|---|
| Pull test | Excellent |
| Tear test | Excellent |

Discussion of Results:

Appearance was better than conventional shingle in all tests. Pull and tear test results indicate a superior product with superior heat resistance, tensile strength and structural strength and with an expected longer useful life than present similar products.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A product comprising a mixture of:
   a. one or more side-branched polyolefins with long-chain side branching from 5 to 20 carbon atoms; having the chemical formula:

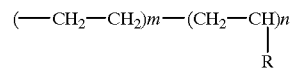

wherein R is representative of side chain branching extending from one or more of the n groups, and the sum of m+n is between 4 and 400, and
   b. a rubber fraction comprising crumb rubber having a mesh size of from about 10 to about 30;
   wherein the rubber fraction comprises up to about 30% by weight of the product.

2. The product of claim 1 also comprising one or more additional synthetic polymers.

3. The product of claim 2 wherein the additional synthetic polymers comprise a blend of polyethylene and polypropylene.

4. The product of claim 1 wherein the rubber fraction comprises crumb rubber having a mesh size of a mixture containing several mesh sizes.

5. The product of claim 1 wherein the rubber fraction comprises crumb rubber and EPDM from a source other than crumb rubber each having a mesh size of from about 10 to about 30.

6. The product of claim 1 wherein the crumb rubber is obtained predominantly from spent automotive tires having a mesh size of from about 10 to about 30.

7. The product of claim 1 wherein the product is substantially free of metal.

8. The product of claim 1 wherein the polyolefin is a saturated ethylene-octene copolymer with long-chain side branching from 5 to 20 carbon atoms.

9. The product of claim 1 further comprising material selected from the group consisting of carbon black, clays, coal fines, aromatic oils, alumina silicates and mixtures thereof.

* * * * *